United States Patent
Weiner et al.

(10) Patent No.: US 7,466,443 B2
(45) Date of Patent: Dec. 16, 2008

(54) METHOD OF AND DEVICE FOR AND COMPUTER PROGRAM FOR ACCESSING DATA

(75) Inventors: Helmut Weiner, Munich (DE); Herbert Hundsnurscher, Woerth (DE)

(73) Assignee: Oce Printing Systems GmbH, Poing (DE)

( * ) Notice: Subject to any disclaimer, the term of this patent is extended or adjusted under 35 U.S.C. 154(b) by 1138 days.

(21) Appl. No.: 10/420,258

(22) Filed: Apr. 22, 2003

(65) Prior Publication Data

US 2004/0008378 A1 Jan. 15, 2004

(30) Foreign Application Priority Data

Apr. 22, 2002 (DE) .................... 102 17 857

(51) Int. Cl.
*G06K 1/00* (2006.01)
*B41F 1/00* (2006.01)

(52) U.S. Cl. .................. 358/1.18; 358/1.16; 711/111; 711/170; 711/200; 399/19

(58) Field of Classification Search ............ 358/1.14, 358/1.15, 1.18, 1.13, 1.1, 1.16; 347/153; 395/401, 114; 711/1, 11, 207, 6, 170, 113, 711/114, 161, 171, 200; 399/18, 19, 21; 345/555

See application file for complete search history.

(56) References Cited

U.S. PATENT DOCUMENTS

| | | | | |
|---|---|---|---|---|
| 5,617,552 A * | 4/1997 | Garber et al. | ............ | 711/1 |
| 5,684,934 A * | 11/1997 | Chen et al. | ............ | 358/1.14 |
| 5,864,652 A * | 1/1999 | Murahashi | ............ | 358/1.16 |
| 6,055,361 A * | 4/2000 | Fujita et al. | ............ | 358/1.15 |
| 6,466,329 B1 * | 10/2002 | Mukai | ............ | 358/1.15 |
| 6,654,134 B2 * | 11/2003 | Sakamoto et al. | ............ | 358/1.14 |
| 6,804,018 B1 * | 10/2004 | Mochizuki | ............ | 358/1.14 |
| 7,069,413 B1 * | 6/2006 | Agesen et al. | ............ | 711/207 |
| 7,084,878 B2 * | 8/2006 | Herceg et al. | ............ | 345/555 |
| 2001/0013942 A1 * | 8/2001 | Sakamoto et al. | ............ | 358/1.13 |
| 2004/0174556 A1 * | 9/2004 | Lapstun et al. | ............ | 358/1.14 |
| 2007/0113042 A1 * | 5/2007 | Adcock | ............ | 711/170 |

OTHER PUBLICATIONS

Numerical recipes in C: The Art of Scientific Computing, Copyright © 1988-1992 by Cambridge University Press. Programs Copyright © 1988-1992 by Numerical Recipes Software.

\* cited by examiner

*Primary Examiner*—Mark K Zimmerman
*Assistant Examiner*—Ashish K Thomas
(74) *Attorney, Agent, or Firm*—Schiff Hardin LLP

(57) ABSTRACT

A method and a device for accessing data wherein the data is sequentially stored as data objects. The data objects are identified by a control variable having consecutive integer values. The control variable and the memory address is determined of a first known data object and an estimate for the size of a data object is determined therefrom. The control variable of the requested data object is multiplied by the estimate, as a result whereof an initial value for a memory address of the requested data object is formed. The actual control variable of the data object stored under the initial value is determined, the search for the requested data object being terminated in the case of correspondence between the actual control variable and the desired control variable, and otherwise the search is continued.

24 Claims, 7 Drawing Sheets

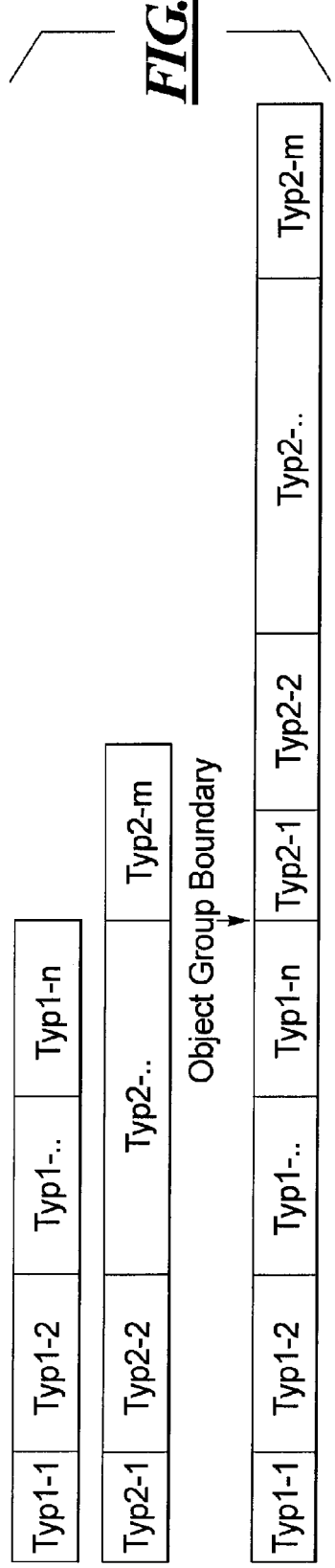
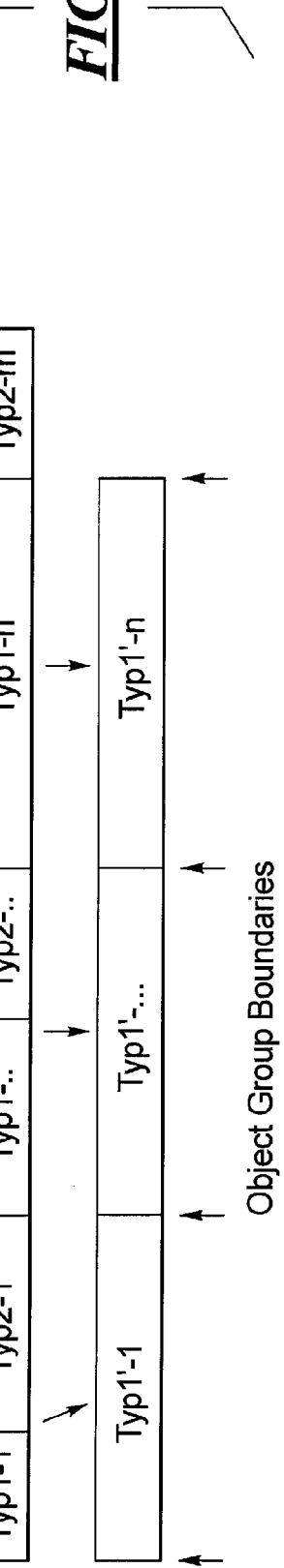

METHOD OF AND DEVICE FOR AND COMPUTER PROGRAM FOR ACCESSING DATA

BACKGROUND OF THE INVENTION

1. Field of the Invention

The present invention relates generally to a method, a device and a computer program for accessing data in which the data is sequentially stored as data objects.

2. Description of the Related Art

The sequentially stored data objects are, for example, print data that is sequentially stored as data objects page-by-page and that forms a print data stream for the printout of a document comprising several printed pages. The stored data objects, however, can also contain other and/or further data types, in particular measurement data, image data and film data. The data objects are linearly organized by being successively created, stored and processed. In general, print data are both linearly generated as well as linearly processed and printed.

When a certain data object is to be required in order to, for example, display a requested print page of a print data stream or to continue printing on a specific print page, an access to the data object of this print page is required. This is particularly necessary when an error occurs at the printer and a new print job has to be created as from a specific print page of the document in order to continue the printout of the document at the abort position.

It is known to read in the print data stream from the beginning of the print data up to the data object of the requested print page at which the printing operation is to be continued or which is to be displayed. This type of search in which all data from the beginning of the data stream up to the requested data object is read in is also referred to as a linear search.

For management of large datasets, non-linear structures of data as well as indexing of the data are known. Implementation of these methods, however, is relatively complicated and requires considerable resources for the creation and management of the data.

In the case of a linear search without indexing, however, depending on the position of the requested print page in the print data stream, a considerable amount of time is required, since all data of the print data stream up to the requested position has to be read in. Further, a binary search method is known, in which the search area is iteratively bisected and as a result thereof the objects are found relatively quickly. The binary search method, however, requires a uniform size of the data objects which, however, is not so in general and in particular in the case of print jobs.

In known applications of the binary search method, a uniform size of the data objects is achieved in that all objects are padded with null data, i.e. with so-called dummy data, to increase the data objects to a preset size. However, this has the consequence that the size of the data stream is considerably increased, so that as a result the generally already very large print data stream is increased even more. The memory space requirement of a data stream which has been increased in such a way can amount to a multiple of the actual print data stream since all objects must have at least the size of the largest data object in the print data stream.

SUMMARY OF THE INVENTION

The present invention provides a method, computer program and a device that allows a fast and easy access to sequentially stored data objects.

This object is provided according to a first aspect of the invention for a method of accessing print data including: a) the data of print pages are stored sequentially page by page as data objects, the data objects being identified by a control variable having consecutive integer values, b) first, the control variable and the memory address of the appertaining data object is determined of a first known print page and an estimate for the size of the data object of a print page is determined therefrom, c) an initial value for a memory address is formed for a requested print page by multiplying the control variable of this requested print page by the estimate, d) the actual control variable of the data object stored under the initial value is determined, and e) in the case of correspondence between the actual control variable and the requested control variable the search for the requested print page is terminated, f) otherwise the search is continued.

BRIEF DESCRIPTION OF THE DRAWINGS

For a better understanding of the present invention reference is made in the following to the preferred embodiments illustrated in the drawings, the embodiments being described by using specific terminology. It is however pointed out that the scope of the invention is not to be restricted thereby since such variations and further modifications with regard to the devices and methods shown as well as such further applications of the invention as illustrated therein are considered as common general current or future knowledge of the relevant person skilled in the art. Embodiments of the invention are shown in the figures.

FIG. 6 is a schematic diagram which shows two sorted subsets of data objects that are sequentially arranged in a memory;

FIG. 7 is a schematic diagram which shows a first embodiment for finding data objects in mixed subsets of data objects;

DETAILED DESCRIPTION OF THE PREFERRED EMBODIMENTS

Figure 1:
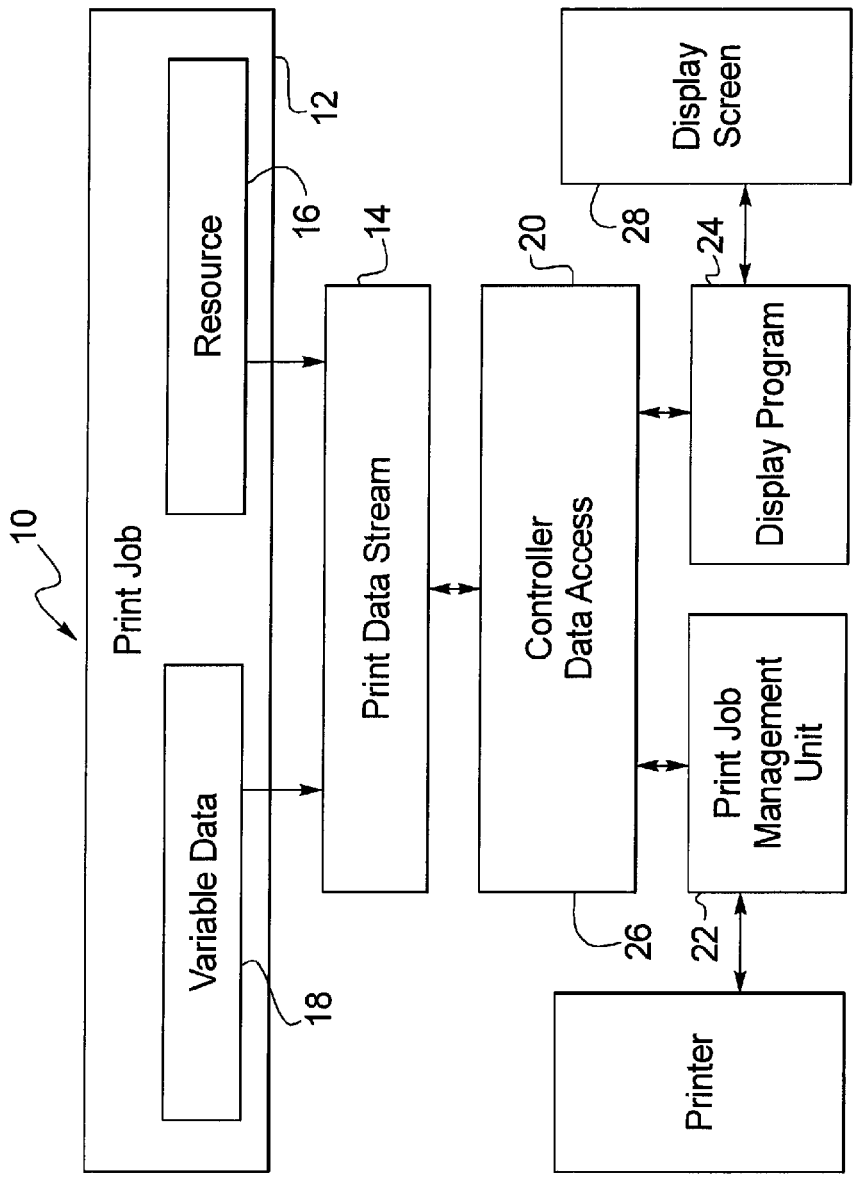
FIG. 1 is a block diagram which shows a system for the output of print data on a printer or display screen with the aid of a data access control.

In FIG. 1, a system for the output of print data is shown. When executing a print job 12, a print data stream 14 is generated which contains resources 16 and variable data 18. The data of the generated print data stream 14 is stored in a memory 15, e.g. on a hard disk memory. In this print data stream 14 the resources 16 are stored sequentially as data objects, the data objects of the resources 16 being identified by a first control variable having consecutive integer values. Subsequently, the data of print pages is sequentially stored page-by-page as data objects in the print data stream 14. The data objects of the print pages are identified by a second control variable having consecutive integer values. The data objects of the print pages contain the variable data 18.

The system 10 for the output of print data further includes a controller 20 for controlling the data access to the print data stream 14 stored in the memory. The controller 20 allows a print job management unit 22 and a display program 24 to access the print data stream 14 in the memory 15. The print job management unit 22, that is designed for example as a so-called print spooler or print queue, manages the print jobs which are to be printed with the aid of the printer 26. When, for example, the printer 26 malfunctions while printing out page 5000 of 250000 print pages of the print data stream and the printing job is to be restarted, the print job management unit requests the print data of the print data stream 14 beginning with the print page 5000 from the controller 20.

For displaying the print page 24100 with the aid of the display program 24 on the display screen 28, the display program 24 requests the data of the data object of the print page 24100 to be displayed from the controller 20. The controller 20 determines the data object of the requested print page 24100 in the print data stream 14 and transmits the data of the data object to the display program 24. The display program 24 processes the print data of the data object and outputs data for the display of the print page to the display screen 28.

Figure 2:
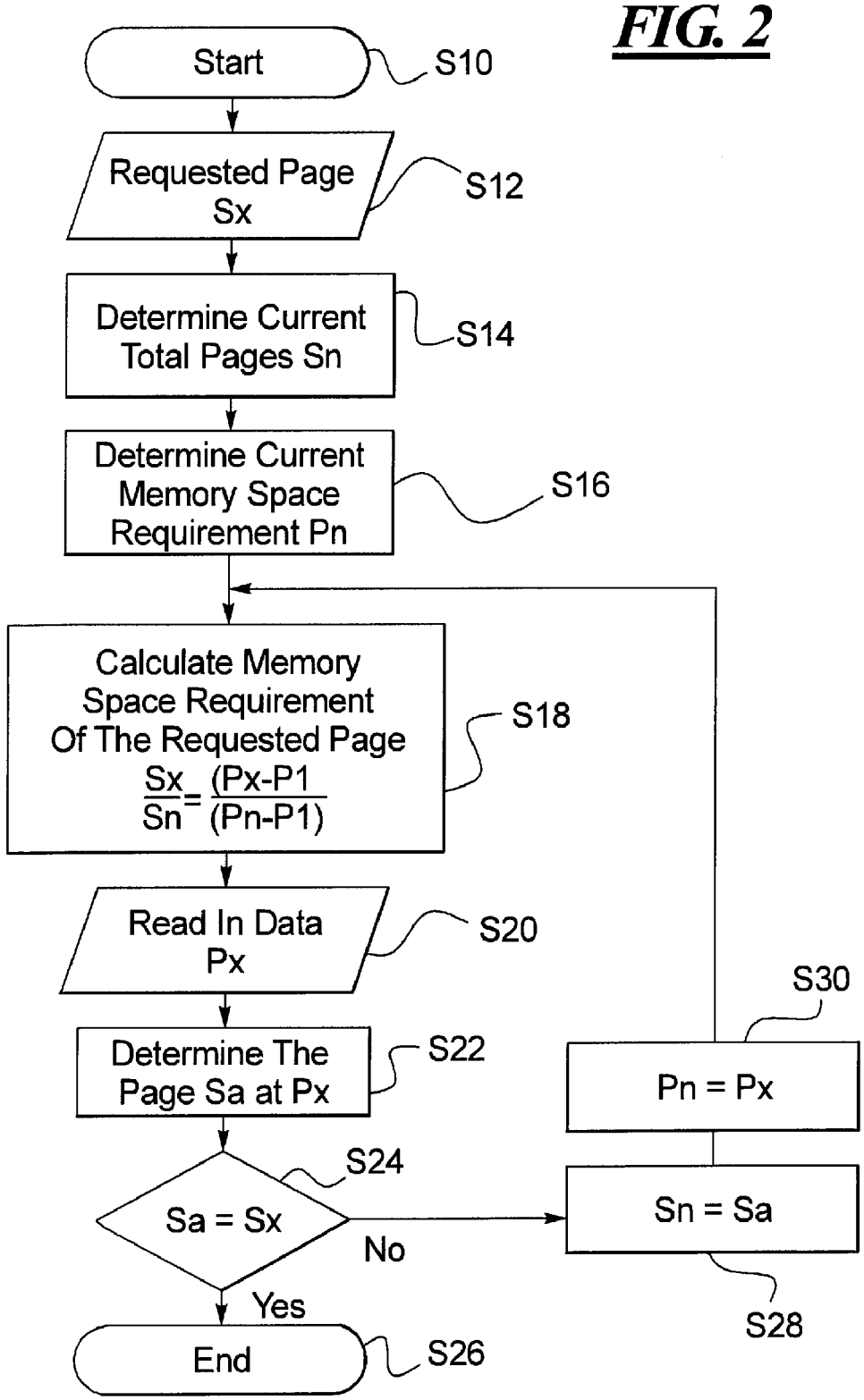
FIG. 2 is a flow chart of the data access control according to FIG. 1.

In FIG. 2, a flow chart is shown in which a requested print page in the print data stream 14 of FIG. 1 is determined by the controller 20. In the drawings where the same elements are shown they are provided with the same reference characters. The sequence is started in step S10. The input of the requested print page, e.g. the print page 24,100 takes place in step S12. Afterwards, the controller 20 (FIG. 1) determines the total number of pages (for example, 250,000) of the print data stream 14. The print data stream 14 can, for example, be stored in one single data file. However, the print data stream 14 does not yet have to contain all of the print pages of the print job 12 before the access. When the print pages of the print job 12 are created sequentially from the variable data 18 and the resources 16, then the controller can already access the created print pages and/or resources. When the entire print job 12 comprises, for example, 250,000 pages and the first 30,000 pages thereof are already created and stored in a data file, then the print page 30,000 is determined as a current total page number Sn in step S14. Subsequently, in step S16 the current memory space requirement Pn of the already created 30,000 pages is determined. In step S18 the average memory space requirement of a data object of the 30,000 already created print pages is determined. This determined value is an estimate for the size of the data object of a print page. This estimate is multiplied by the control variable, i.e. the page number, of the requested print page Sx (i.e. by 24,100). As a result thereof, one obtains an initial value Px for a memory address of the requested print page Sx. The memory area in which the print pages S1 to Sn are stored starts at the memory address P1. This starting value P1 is correspondingly taken into account when determining the initial value Px for a memory address.

In step S20, the data at the memory address of the initial value Px are read. With the aid of a suitable algorithm a predetermined position, for example the beginning of the data object at the memory address of the initial value Px, is determined, the data, for example, being linearly read in as from the initial value Px and being searched for a preset character string. This preset character string characterizes the beginning of each data object. By this beginning, the position in the data object at which the control variable is stored can easily be determined. Subsequently, with the aid of this position the control variable is determined in step S22.

Thus, in the present embodiment, the page number Sa of the data object at the memory address Px is determined as a control variable, as a result whereof the actual control variable Sa of the data object stored under the initial value Px is determined. In step S24, it is subsequently checked whether the actual control variable Sa corresponds to the requested control variable Sx, i.e. whether the page number Sa of the print page determined at the memory address Px corresponds to the page number Sx of the requested print page. When a correspondence is determined, the search for the requested print page Sx is terminated in step S26. If this is not the case, then the control variable Sn of the largest print page is replaced by the value of the actual control variable Sa in step S28. Afterwards, the value of the memory address Pn is replaced by the value initial value of the memory address Px in step S30. Subsequently, the sequence is continued in step S18. By repeatedly executing the steps S18 to S30, an iteration takes place. The requested print page Sx is approximated in several steps.

Figure 3:
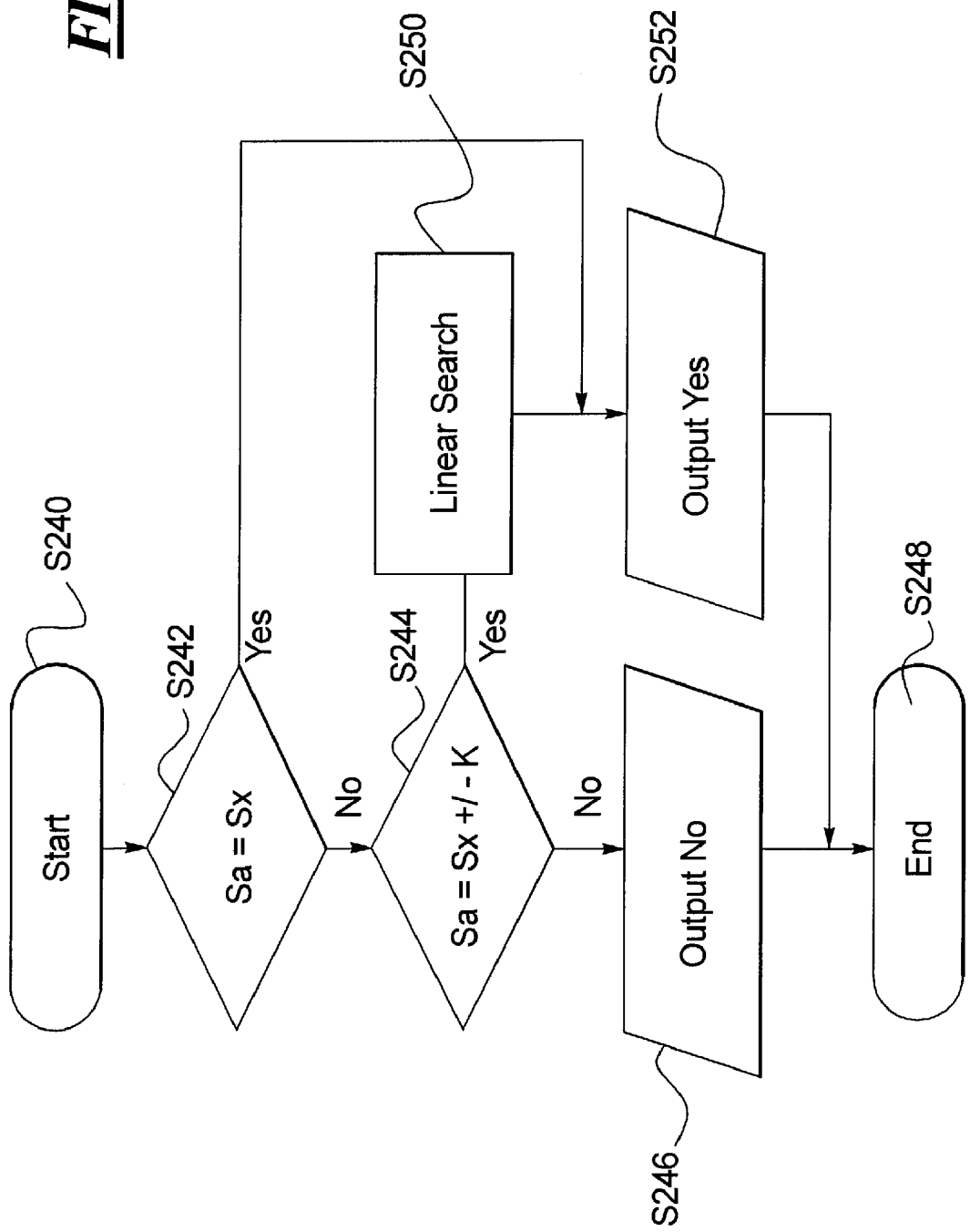
FIG. 3 is a flow chart with a detailed sequence of the step S24 according to FIG. 2.

In FIG. 3, a sequence of the step S24 according to FIG. 2 is illustrated in detail. In this step, a check is performed as to whether the actual control variable Sa corresponds to the control variable Sx of the requested print page. The sequence is started in step S240. Then, in step S242 a check is performed as to whether the control variable Sx of the requested print page exactly corresponds to the actual control variable Sa. When this is the case, then subsequently, in step S252 the value yes is output and the sequence is terminated in step S248. When this is not the case, then the sequence is continued in step S244. It is checked in step S244 whether the determined actual control variable Sa deviates from the control variable Sx of the requested print page by a preset value K at maximum. When this is the case, then the search is continued in step S250 by a linear search up to the data object of the requested print page and the value yes is subsequently output in step S252, as a result whereof the sequence shown in FIG. 2 is terminated in step S26. During the linear search in step S250, all data is read in as from the determined memory location Px up to the memory location of the data object of the requested print page.

When, however, it is determined in step S244 that there is a greater deviation of the actual control variable Sa from the control variable Sx of the requested print page, then in step S246 the value no is output, as a result whereof the sequence shown in FIG. 2 is continued after step S24 in the step S28 and a new iteration step is executed.

Figure 4:
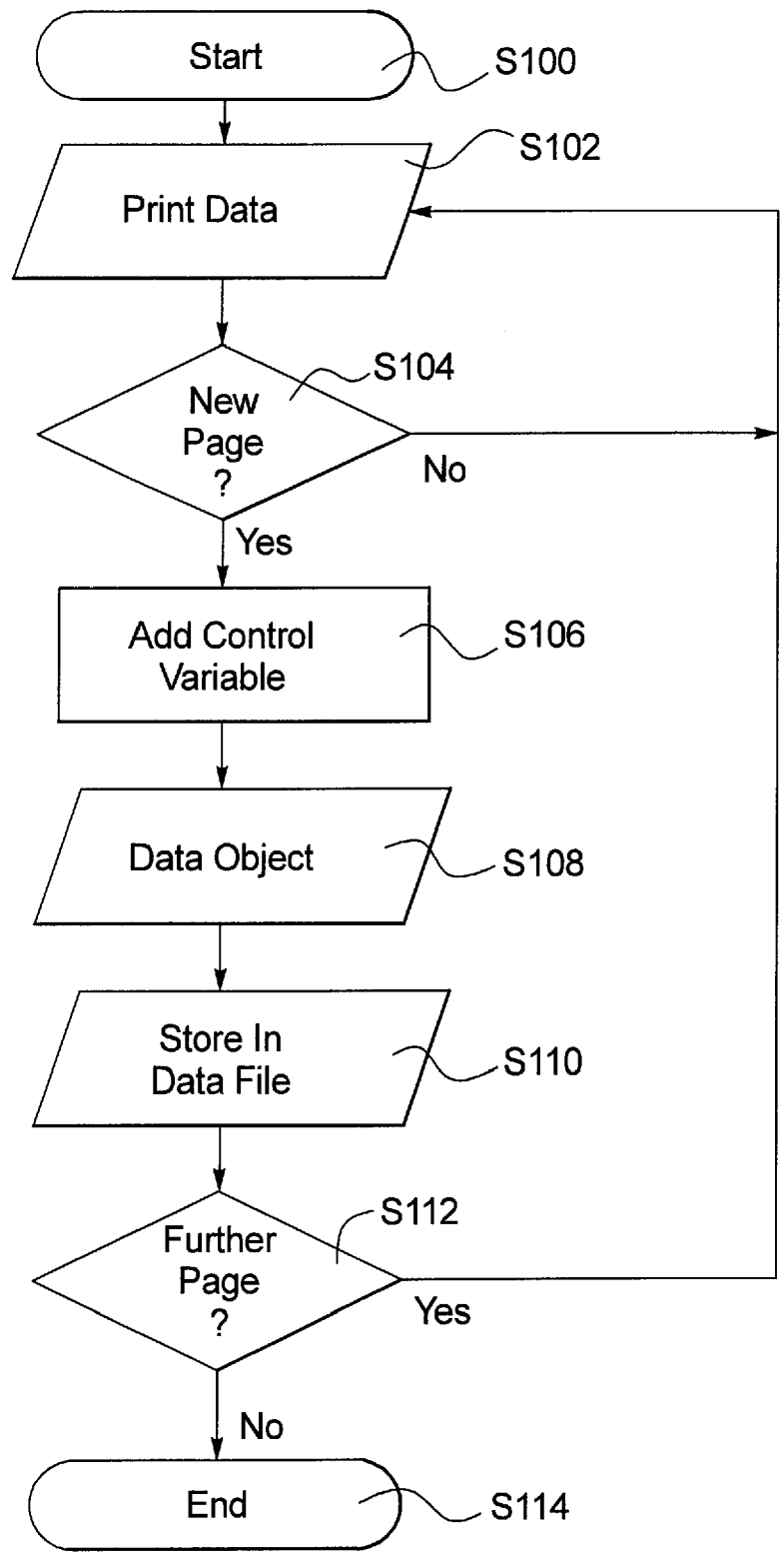
FIG. 4 is a flow chart for creating print data.

In FIG. 4, a flow chart for generating a print data stream is illustrated, the data of print pages being stored sequentially page-by-page as data objects and the data objects being identified by a control variable (S1-Sn) having consecutive integer values. The sequence is started in step S100. In step S102 print data is read in. In step S104 it is checked whether the print data belongs to a new print page. When this is not the case, then the sequence is continued in step S102 at which further print data is read in.

When, however, it is determined in step S104 that the print data read in at step S102 are allocated to a new print page, then in step S106 a new control variable is generated and added to the print data. Subsequently, in step S108 a new data object is created which at least contains the print data allocated to the respective print page and the control variable allocated to the data object. The data object with the print data is then stored in a data file in step S110, the data object being stored sequentially with other data objects in the data file.

In step S112, a check is performed as to whether there is print data for a further print page. When this is not the case, then the sequence is terminated in step S114. When, however, further print data for a further print page is present, then the sequence is continued in step S102 in which further print data is read in.

By the sequence illustrated in FIG. 4, the data of print pages is stored sequentially as data objects in a data file, the data objects being identified by a control variable having consecutive integer values. This control variable can, for example, be a consecutive page number in the print job. However, other control variable sequences are possible, such as 2, 4, 6, 8, . . . ; 1, 3, 5, 7, 9, . . . ; 1, 3, 5, 7, 11, 13, . . . . The determined and preset memory addresses can be virtual memory addresses and do not have to correspond to the actual physical memory addresses. It is, for example, possible that a data file is stored in several differently arranged sectors in a hard disk memory and the print pages are stored consecutively in the data file but not stored consecutively in the hard disk memory physically. With the aid of the method explained in FIGS. 1 to 4, preferably the memory location of a data object, i.e. of a print page, in a data file is determined. The value K provided in the flow chart according to FIG. 2 and by which the actual control variable can deviate from a desired control variable has a value in the range of 2 and 1000. Preferably, this value is preset to 10.

In another embodiment, the memory address Px +/−1 of the data object which directly follows the actually determined data object to the data object of the requested print page or, respectively, which is directly stored before the actually determined data object in the memory is used as memory address of the known print page Sn in the case of a repeated execution of the steps S18 to S30. As a result thereof, a faster approximation to the requested data object is achieved in particular for very large data objects.

The print data stream 14 can then comprise up to several terabytes. In the case of currently common operating systems, such as MS WINDOWS NT, MS WINDOWS 2000 (both trademarks of Microsoft Corp.) and LINUX, data files having a theoretical size of up to 264 bytes can be created. The access to data objects in such large data files can drastically be accelerated with the aid of the inventive method. When such data files are, for example, stored in a hard disk memory, then a direct access to the data objects in a data file is possible even when they, for example, in a print data stream 14 with usual processing, i.e. when supplying the print data stream 14 to the printer 28, are processed successively from the beginning to the end.

Currently, print data streams of about 64 million pages are common, for example, for generating invoices for several million customers with several pages each. Then, a data file in which such a print data stream 14 is stored, is usually greater than four gigabytes. In order to carry out an indexing of such a data file, per print page 8 bytes are necessary for storing the memory location Px of each print page. Thus, merely for the page management in the main memory 512 megabytes are necessary in order to be able to access individual pages also non-linearly. Such a management of the print pages would require considerable resources and is currently not justifiable. The method described in FIGS. 1 to 4 serves for the fast access to individual data objects without the entire print data stream 14 having to be searched from the beginning up to the requested data object.

At the end and/or at the beginning of a data object, the control variable and/or the page number of the print page can be stored in an area of the data object provided for this purpose. Such data areas can, for example, be so-called head areas or headers. When several types of data objects are successively stored in a data file in object groups, then in these areas of each data object the boundary or, respectively, the memory location of the boundary of the object groups can likewise be stored. The individual data objects usually have a size between some kilobytes and several megabytes. However, the method described can also be applied to data objects with less bytes and to data objects having up to several gigabytes.

Figure 5:
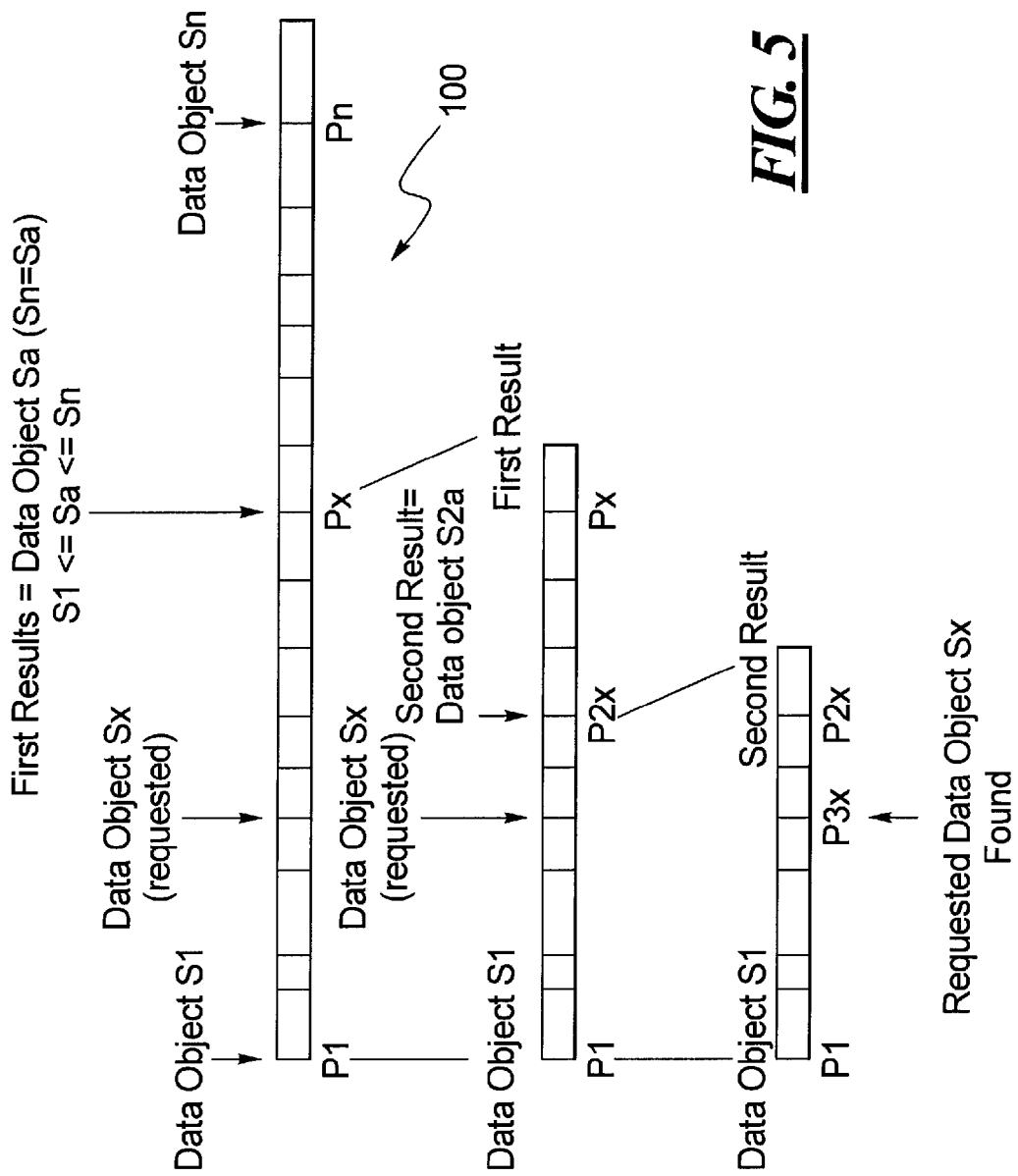
FIG. 5 is a schematic illustration for finding a data object in several iteration steps.

In FIG. 5, a schematic overview of the data objects S1 to Sn that are sequentially consecutively stored in a data file 100 is illustrated. The data object Sx, which is arranged in the data file 100 between the data object S1 and the data object Sn is to be searched. This data object Sx contains the data of a requested print page that, for example, is to be displayed on the display screen 28. After the sequence according to FIG. 2 has been executed one time, a memory address Px at which the data object of the print page Sa is stored has been determined as a first result. The data object Sa is stored at the memory location Px determined with the aid of the sequence according to FIG. 2 and is read out from this memory location Px at least so far that the control variable Sa, i.e. the page number, of the data object stored at the memory location Px has been determined. Subsequently, during the repeated execution of the steps S18 to S30 of the sequence according to FIG. 2 for determining the memory location of the data object Sx, only the area between the data object S1 and the data object Sa is taken into account in which the data object Sx of the requestedrint page is stored.

When the steps S18 to S30 are repeatedly executed, a second result is determined, a memory location P2x being determined at which the data object S2a is stored. In the subsequent execution of the steps S18 to S30, the control variable Sn is replaced by the control variable S2a and the memory location Pn is replaced by the memory location P2x. In a third execution of the steps S18 to S26, the memory location P3x is determined at which the requested data object Sx is stored. The data object Sx of the requested print page is thus determined after the third execution, i.e. the memory location of the requested data object Sx is determined.

In an alternative, as already described in connection with FIG. 3, the search for the data object Sx can be carried out linearly proceeding from the memory location P2x after determination of the second result.

In FIG. 6, sorted subsets of data objects are illustrated. Data objects of the type 1 (denoted Typ1) and of the type 2 (denoted Typ2) are each successively sequentially stored in a memory, the data objects each being identified by a control variable having consecutive integer values. The data objects of the type 1 comprise consecutive data objects from 1 to n. The data objects of the type 2 are identified by a control variable having consecutive integer values from 1 to m. The data objects are stored in sorted subsets, i.e. sorted according to type, in a memory. First, the data objects of the type 1 are sequentially stored in the memory and afterwards the data objects of the type 2. Between the data object n of the type 1 and the data object 1 of the type 2 there is the object group boundary. When a data object Sx of the type 2 is to be determined, then the method according to the invention is only applied to the data objects of the type 2. Both the memory area as well as the control variable of the data objects of the type 1 are then not taken into account. When, however, a data object of the type 1 is to be determined, for example the data object Typ1-x, then only data objects of the type 1 are taken into account when implementing the inventive method. For the implementation of the method only the memory area and the data objects starting from or, respectively, up to the object group boundary are relevant.

In FIG. 7, data objects of the type 1 and of the type 2 which are sequentially stored are illustrated, the data objects of the type 1 and of the type 2 having an arbitrary order. For finding a data object of the type 1, the sequence of data objects is considered such for implementing the method that there are only data objects of the type 1, the data objects of the type 2 being considered as appertaining to the type 1. The data objects of the type 2 are allocated to data objects of the type 1, and are thus at least virtually combined. The combined data objects are identified by Typ 1' in FIG. 7. Thus, data objects of the type 1' are considered, which contain both data objects of the type 1 and of the type 2. The data objects of the type 1' are identified by the control variables of the type 1.

Figure 8:
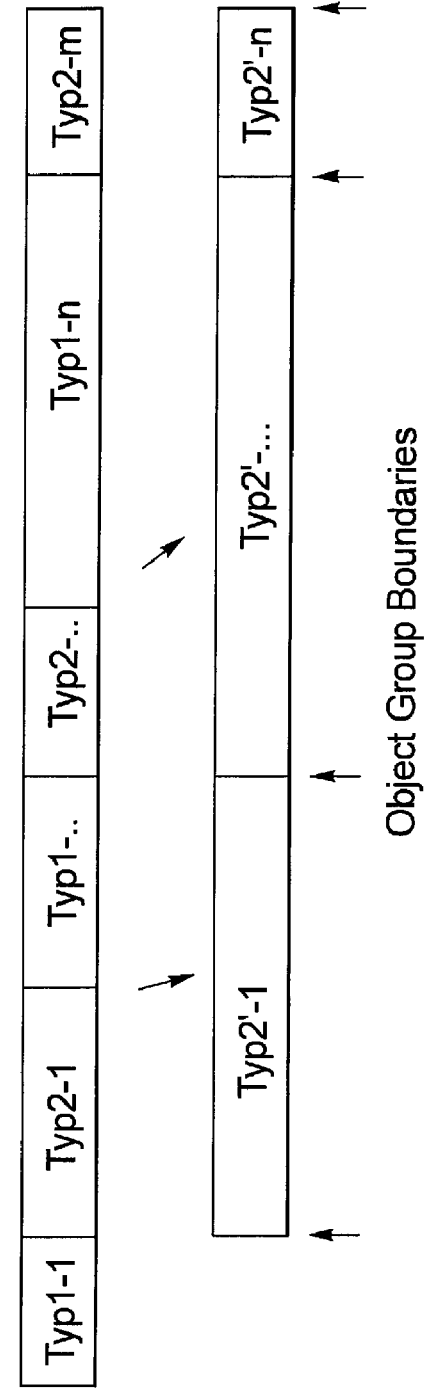
FIG. 8 is a schematic diagram which shows a second embodiment for finding data objects in mixed subsets of data objects.

In FIG. 8, a data object of the type 2 is to be determined from the data object sequence according to FIG. 7. The data objects of the type 1 and of the type 2 are then combined to data objects of the type 2' in the same manner as the data objects of the type 1 and of the type 2 have been combined to the data objects of the type 1' according to FIG. 7, the combined data objects, however, having the control variable of the data object of the type 2.

The method can also be applied to sequences of data objects having a plurality of data object types, which are then combined to types of the requested type class in the same manner as for type 1 and type 2.

Figure 9:
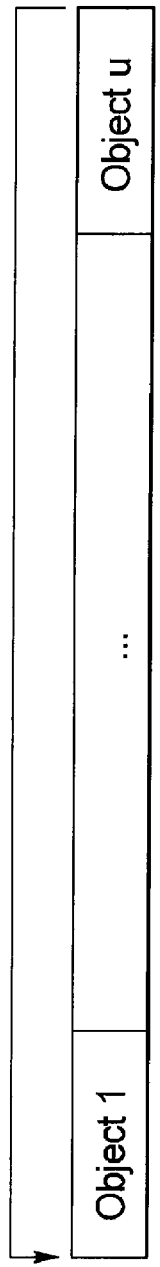
FIG. 9 is a schematic diagram which schematically shows the finding of boundaries of the object groups.

A group of data objects 1 to n is illustrated in FIG. 9. Each object 1 to n contains in the last 256 bytes among other things the total memory area of the objects 1 to n, i.e. the total size of all data objects already sequentially stored. As a result thereof, the memory address P1 can easily be determined by reading out this information from the last stored data object. This is particularly advantageous when, as described in connection with FIG. 6, several object types are stored in sorted subsets. The memory address P1 of the respective object type can then easily be determined by reading out this information.

In the case of a print data stream 14, usually data objects that contain data of resources are stored first. Subsequently, the data of print pages is stored sequentially page-by-page as data objects. By reading out the last 256 bytes of a data object of a print page, the object boundary between the resource data objects and the print page data objects can easily be determined. When the memory location Px of a requested print page is to be determined, as described in connection with FIG. 1, the last stored 256 bytes are read. When no control variable (S1, Sx, Sn) of a print page is determined, no data objects of print pages are stored yet. When, for example, as described, resource data objects and subsequently print page data objects are written into a data file, then it is possible during the creation of this data file that the writing or, respectively, the creation of the resource data objects is not yet terminated when the last 256 bytes do not contain a control variable of a print page.

In these 256 bytes information about the object length of the respective data object can further be included so that a positioning on the object beginning can easily be achieved, as a result whereof, as already described, the next iteration step can be continued from the end or from the beginning of the determined data object, depending in which direction, as seen from the data object, the requested data object is arranged.

The data objects can, however, also be stored in a main memory, a removable medium store and/or a magnetic tape memory. The inventive method can be applied to arbitrary sets of data objects as illustrated by FIGS. 6 to 8. In particular, the described method and the described device can also be used for finding data objects in sets of other data types, such as for finding individual images in film data or for finding individual measurement values in measurement data.

The present invention may be embodied in software such as in a computer program for implementation on a computer.

The computer program performs the method steps set forth above when executed on a computer. Such a computer program may be stored on a data storage location of the computer, such as on fixed or removable disks or tape or on optical computer media such as CD-ROMs or DVD-ROMs. The computer program may be stored on and/or accessed and operated over a network connection such a local network or wide area network or over the Internet.

Thus, the preferred embodiments provide that the data that is sequentially stored as data objects page-by-page is identified by a control variable having consecutive integer values. The control variable and the memory address of a first known data object are determined. An estimate for the size of a data object is determined therefrom. An initial value for a memory address is formed for a requested data object by multiplying the control variable of the requested data object by the estimate. Subsequently, the actual control variable of the data object stored under the initial value is determined. In the case of correspondence between the actual control variable and the requested control variable, the search for the requested data object is terminated. Otherwise, the search is continued.

By this method, a reduction of the search effort and time for finding a requested data object is considerably reduced. In particular, in the case of differently sized data objects a significant reduction in the amount of time required for finding the data object is provided. Only little resources are required for implementing the method. A position of a data object is determined which, at least with respect to a data object stored first in the data stream and at which a linear search is usually started, has a memory address that is approximated to the requested data object. The search can then be continued as from this determined data object. When the search is, for example, linearly continued, then only those data objects have to be searched that are arranged between the determined data object and the requested data object in the memory.

It is of particular advantage to use this method for finding requested print pages in large print files, in particular in print data streams that are stored on data carriers such as hard disks. This data files are usually larger than 16 megabytes and can have sizes of far more than 4 gigabytes up to several terabytes. Theoretically, considerably larger files are conceivable. In particular in multi-color printing, print data streams comprising large datasets are created. With the aid of the inventive method, a specific data object, i.e. the data of a requested print page, of such a print data stream or, respectively, of such a dataset, can easily and quickly be accessed.

It is advantageous to use the last stored print page as first known print page. As a result thereof, the average value of all data objects stored up to then can be generated as the estimate.

In another advantageous development of preferred embodiments of the method the steps are repeated when the search is continued, the initial value for the memory address being used upon repetition as the memory address of the known first print page and the actual control variable of the found print page being used as the control variable of the known first print page. As a result thereof, an initial value for a memory address is formed which is positioned even closer to the data object of the requested print page. By repeatedly executing the method steps while using the previously determined initial value and the data object stored thereat, the approximation to the data object of the requested print page takes place iteratively. By means of this iterative method, at least a quick approximation to the memory address of the requested print page takes place. In this course it is advantageous to terminate the iterative search, i.e. the repetition of the method steps mentioned, when the control variable of the data object stored under the initial value differs from the data object of the requested print page by a predetermined number of data objects at a maximum, i.e. by a predetermined amount of the control variable. Then, the search can be continued, for example, by a linear search up to the data object of the requested print page.

In a development of the invention, when implementing the inventive method again, the memory address of that data object which directly follows or, respectively, directly precedes the actual determined data object with regard to the data object of the requested print page is used as the memory address of the known first print page. Furthermore, for the further search the control variable of the respective data object is used. For determining the control variable of the actually determined print page, at least part of the data object is read in, the memory location of the neighboring, i.e. the following or preceding, data object being determined. In particular when there are large differences in the size of the data objects, this allows a considerable approximation to the data object of the requested print page.

According to a second aspect of an embodiment of the invention, a device for accessing print data is specified. The device for accessing print data has a memory in which the data of print pages is stored sequentially page by page as data objects. The data objects are identified by a control variable having consecutive integer values. The device further includes a data processing unit that determines the control variable and the memory address of the appertaining data object of a first known print page. The data processing unit determines an estimate for the size of the data object of a print page therefrom.

For a requested print page, the data processing unit forms an initial value for a memory address by multiplying the control variable of this requested print page by the estimate. The data processing unit then determines the actual control variable of the data object stored under the initial value. In the case of correspondence between the actual control variable and the requested control variable the data processing unit terminates the search for the requested print page, otherwise the search is continued.

The device for accessing print data allows to determine the position of the data of a requested print page and to display these requested print data, for example, on a display unit or to output them on a printer.

A third aspect of the invention relates to a method of accessing resources. The access to resources that are stored sequentially as data objects takes place in the same way as the access to data objects comprising data of a print page. What is achieved by the method of accessing resources is that the access to data of resources can take place quickly with little effort.

A fourth aspect of the invention relates to a method of accessing an arbitrary data type. The method according to the fourth aspect substantially differs from the method as initially set forth in that it is suitable for any data type.

Although other modifications and changes may be suggested by those skilled in the art, it is the intention of the inventors to embody within the patent warranted hereon all changes and modifications as reasonably and properly come within the scope of their contribution to the art.

We claim:

1. A method of accessing print data, comprising the steps of:
    storing data of printed pages sequentially page-by-page as data objects at addresses in a memory;
    identifying the data objects by corresponding control variables having consecutive integer values;
    initiating a search for a requested print page, including:
        determining a control variable and a memory address of an appertaining data object of a first known print page and determining an estimate for a size of the data object of a print page;
        forming an initial value for a memory address for the requested print page by multiplying a control variable of the requested print page by the estimate;
        determining an actual control variable of a data object stored in the memory under the initial value of the memory address;
    terminating the search for the requested page in case of correspondence between the actual control variable of the data object stored in the memory and the control variable of the requested page; and
    otherwise continuing the search.

2. A method according to claim 1, wherein the first known print page is a currently last stored print page.

3. A method according to claim 1, wherein all data objects are contained in a data file.

4. A method according to claim 1, further comprising the step of:
    repeating said step of searching at least once;
    using said initial value formed in said forming step as the memory address for the first known print page in the step of determining the control variable of the first known print page during said repeated searching, and
    using the actual control variable determined in said step of determining the actual control variable as the control variable during said repeated searching.

5. A method according to claim 4, wherein said step of searching is repeated until the actual control variable deviates from the control variable of the requested print page by at most a predetermined value.

6. A method according to claim 5, wherein said predetermined value is in a range of 2 and 1000.

7. A method as claimed in claim 5, wherein said predetermined value is 10.

8. A method according claim 4, further comprising the step of:
    using a control variable of a respective data object which is adjacent to an actually determined data object as the control variable of the known first print page during said repeated searching, and
    using the memory address of the adjacent data object is used as the memory address during said repeated searching.

9. A method according to claim 5, further comprising the step of:
    continuing said searching step by performing a linear search up to the data object of the requested print page.

10. A method according to claim 1, wherein said step of storing includes storing the data objects in at least one of: a main memory and a hard disk memory and a removable medium store and a magnetic tape memory.

11. A method according to claim 1, wherein said control variable is a consecutive page number of a respective print page in a print data stream.

12. A method according to claim 3, wherein said data file contains further data objects with resources, the data objects with resources being stored at memory addresses before the data objects with data of the print pages.

13. A method according to claim 12, further comprising the step of:
    storing the control variable and the memory location of the data object with data of a print page first stored in the data file for each data object with data of a print page.

14. A method according to claim 1, further comprising the step of:
reading out at least the data of the data object of the requested print page from a memory by a data processing unit; and
outputting the data.

15. A method according to claim 14, wherein said outputting step outputs the data on a display screen using a display program.

16. A method as claimed in claim 14, wherein said outputting step outputs the data on a printer using a print job management unit.

17. A method according to claim 1, wherein at least several of the data objects have differing sizes.

18. A method according to claim 17, wherein the data objects are of a size in a range of one kilobyte to one gigabyte.

19. A method according to claim 1, wherein said storing step stores data objects of a first type and at least of a second type; and further comprising the steps of:
using only data objects of the first type for implementing the searching step when accessing a data object of the first type; and
using only data objects of the second type for implementing the searching step when accessing a data object of the second type.

20. A device for accessing print data, comprising:
a memory in which data of print pages is sequentially stored page-by-page as data objects, the data objects being identified by a control variable having consecutive integer values;
a data processing unit that is operable to first determine the control variable and the memory address of the appertaining data object of a first known print page and then determine an estimate for a size of the data object of a print page therefrom, said data processing unit being operable to form an initial value for a memory address for a requested print page by multiplying the control variable of the requested print page by the estimate, said data processing unit being operable to determine the actual control variable of the data object stored under the initial value, and in the case of correspondence between the actual control variable and the desired control variable terminates the search for the requested print page, and otherwise continues the search.

21. A method of accessing resources, comprising the steps of:
storing data of resources sequentially as data objects in a memory, the data objects being identified by a control variable having consecutive integer values,
determining first the control variable and a memory address in the memory of an appertaining data object of a first known resource and determining an estimate for a size of the data object of a resource therefrom;
forming an initial value for a memory address for a requested resource by multiplying the control variable of a requested resource by the estimate;
determining an actual control variable of a data object stored in the memory under the initial value in a search;
terminating the search in case of correspondence between the actual control variable and the control variable for the requested resource; and
otherwise continuing the search.

22. A method of accessing data, comprising the steps of:
storing data of data objects sequentially in a memory;
identifying the data objects by a control variable having consecutive integer values;
first determining the control variable and a memory address in the memory of the data object of a first known print page and an estimate for an average size of a data object;
in a search, forming an initial value for the memory address for a requested data object by multiplying the control variable of the requested data object by the estimate;
determining an actual control variable of the data object stored in the memory under the initial value;
terminating the search for the requested data object in case of correspondence between the actual control variable and the requested control variable; and
otherwise continuing the search.

23. A computer readable medium on which is stored in computer readable form a computer program for accessing data objects in a memory, comprising:
a data access controller for controlling access to the memory;
an input for accepting a request for a data object as a requested data object; and
program modules which are operable when executed on a computer to perform the steps of:
storing data of the data objects sequentially in the memory;
identifying the data objects by a control variable having consecutive integer values;
initiating a search for the requested data object by first determining the control variable and a memory address in the memory of the data object of a first known print page and an estimate for an average size of a data object;
in the search, forming an initial value for the memory address for a requested data object by multiplying the control variable of the requested data object by the estimate;
determining an actual control variable of the data object stored in the memory under the initial value;
terminating the search for the requested data object in case of correspondence between the actual control variable and the requested control variable; and
otherwise continuing the search.

24. A data storage media having stored thereon a computer program, comprising:
program modules which are operable when executed on a computer to perform the steps of:
storing data of the data objects sequentially in a memory;
identifying the data objects by a control variable having consecutive integer values;
initiating a search for a requested data object by first determining the control variable and a memory address in the memory of the data object of a first known print page and an estimate for an average size of a data object;
in the search, forming an initial value for the memory address for a requested data object by multiplying the control variable of the requested data object by the estimate;
determining an actual control variable of the data object stored in the memory under the initial value;
terminating the search for the requested data object in case of correspondence between the actual control variable and the requested control variable; and
otherwise continuing the search.

* * * * *